Oct. 25, 1966  W. LANDGRAF  3,281,674
ECHO RANGING OF FAULTY COIL SECTIONS IN COIL-LOADED
CABLES UTILIZING DAMPED OSCILLATIONS
Filed Dec. 22, 1965
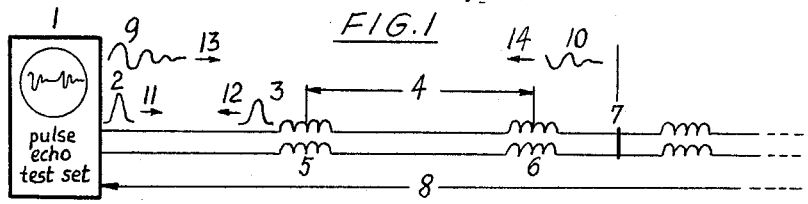
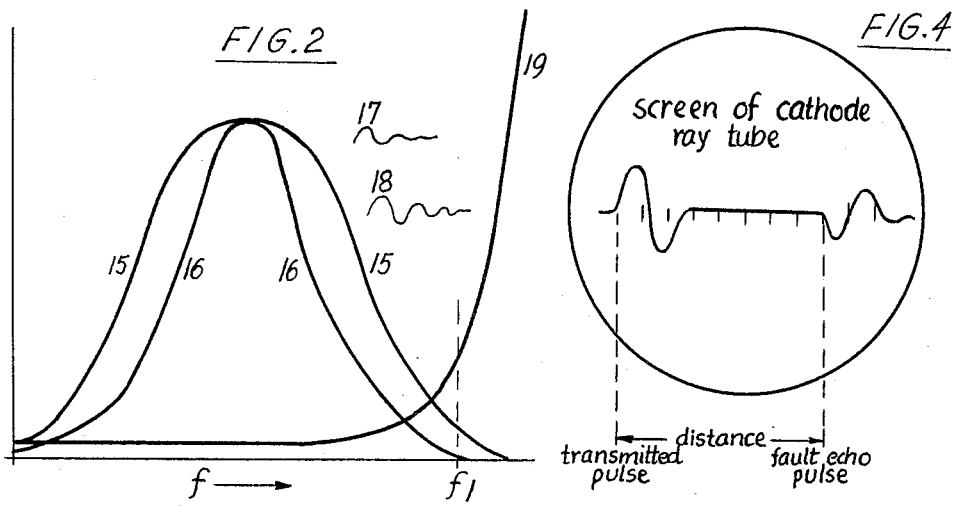
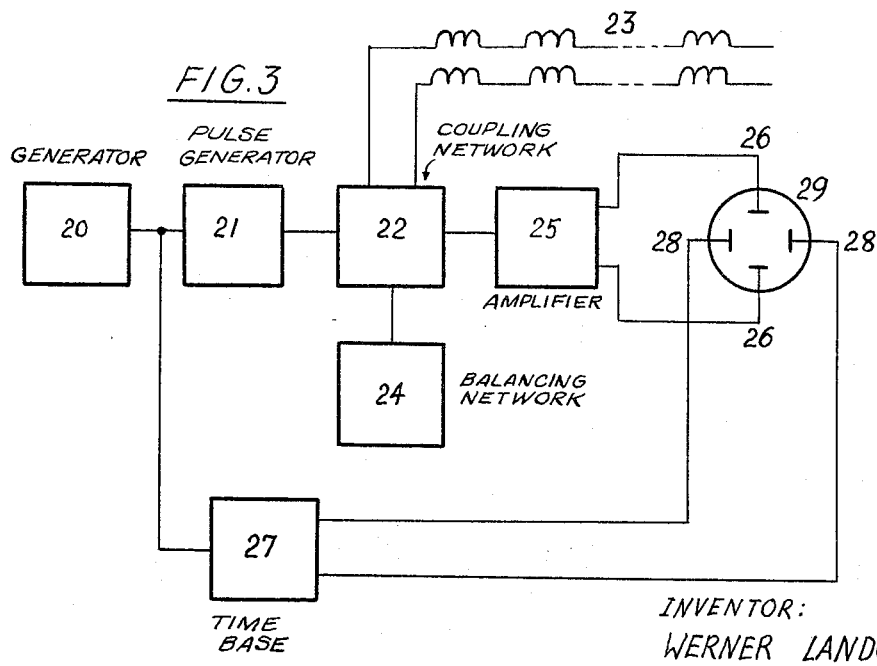
INVENTOR:
WERNER LANDGRAF
BY
LOWRY & RINEHART
ATTORNEYS

United States Patent Office 3,281,674
Patented Oct. 25, 1966

3,281,674
ECHO RANGING OF FAULTY COIL SECTIONS IN COIL-LOADED CABLES UTILIZING DAMPED OSCILLATIONS
Werner Landgraf, Preetz, Holstein, Germany, assignor to Kieler Howaldtswerke AG Kiel-Dietrichsdoff, Germany, a firm
Filed Dec. 22, 1965, Ser. No. 515,614
Claims priority, application Germany, Jan. 20, 1962, K 45,732
2 Claims. (Cl. 324—52)

This invention relates to improvements in an echo ranging of faulty coil sections in coil-loaded cables and is a continuation-in-part of the application filed by me on December 26, 1962, Serial No. 247,279, now abandoned and embodies improvements in the art thereover.

A coil-loaded cable consists of a number of series-connected two-wire lines of mostly equal length between which in each case two coupled coils are arranged, one in each conductor. The cable section from the middle of one coil to the middle of the next coil is called a coil section. The coil-loaded cable has a low-pass characteristic, that is, it can be passed by frequencies from zero up to the limiting frequency. Frequencies above the limiting frequency are strongly damped.

A fault location in coil-loaded cables must therefore, when it is intended to use pulses, be carried out with such pulses that can pass through the coil-loaded cable. Coil-loaded cables have limiting frequencies of some kilocycles per second. The pulses must therefore consist of frequencies of the order of kilocycles per second. Hence, they have only a slight edge steepness. A slight edge steepness, however, causes less measurement accuracy in the fault location in such cables. However, a faulty coil section can be located with sufficient accuracy.

As sufficient test sets and test methods are available for unloaded cables, it will be sufficient to determine the faulty coil section in faulty coil-loaded cables and then, after opening of the connection between the coil next to the measured point and the cable, to carry out accurately an exact location of the fault with the aid of known means mentioned in the following.

For fault-finding in unloaded cables and lines a number of reliable methods are known, among which there are resistance- and capacitance bridges, standing wave and pulse reflection measuring instruments, respectively. These latter excel by their accurate measurements and allow examination of the cable condition which will result in a rapid location of faults and irregularities. Moreover, there are additional advantages such as the possibility of measuring the positions of crosstalk circuits and the determination of the exchange of the cores in telephone lines. Apparatus of this type operate with D.C. pulses, similar to a surge function, or with a steep front and gradually dropping rear, or similar to a $\cos^2$ shape.

From the desire for a great accuracy of measurement there results the demand for a relatively steep front flank of the pulses. The frequency spectrum, therefore, extends to very high frequencies. The pulse shapes mentioned above cannot be used in coil-loaded cables because of the low-pass filter effect of said cables. Such pulses will suffer considerable deformation, and because the loading coils are rather mismatched at the cable above the limiting frequency a reflection of approximately 100% will result already at the connection point between the first line section and the first coil. No pulse energy is, therefore, able to enter the subsequent coil sections, so that measurements behind the first coil are impossible.

Pulses with steep flanks are thus suited only for measurement in smooth cable sections and not for the measurement in coil-loaded cables. Pulses of the specified type can, however, be used for the fault location on the cable section between two coils in a coil-loaded cable if the faulty coil section is determined in the following manner.

It is the object of the invention to provide a method of locating faulty coil sections in coil-loaded cables by pulse reflection, which comprises the steps of:

(a) Generating pulses in the form of damped sinusoidal oscillations having a relatively limited frequency spectrum referred to high frequencies, the frequency spectrum of said pulses being limited approximately to the range of the bandwidth of the coil-loaded cable, (b) Applying said pulses to said cable whereby the same pass the coils thereof and are reflected by faults in the cable or in the coils, and (c) Determining the position of the fault by means of the reflected pulses.

In the method as defined above, the frequency of the applied pulses is approximately one half of the limiting frequency of the coil-loaded cable under test and the number of said sinusoidal oscillations is at least one full period.

The use of such pulses eliminates reflections due to the coils because the bandwidth of the pulses is equal to or smaller than that of the coil-loaded cable.

One single full sinusoidal period of oscillation requires the full bandwidth of the coil-loaded cable. In such a case the frequency of the sinusoidal oscillation must be approximately equal to half the limiting frequency.

The more sinusoidal periods the measuring pulse has, the less is the bandwidth required. In such a case the frequency of the sinusoidal oscillation can be higher than half the limiting frequency. However, it must be warranted that the high frequencies of the pulse frequency spectrum are not higher than the limiting frequency of the coil-loaded cable.

The novel method of this invention will be best understood by reference to and a description of the drawing in which:

FIG. 1 is a diagram illustrating the arrangement of a coil-loaded cable connected to a pulse echo test set;

FIG. 2 is a diagram illustrating the attentuation curve of a coil-loaded cable as a function of frequency;

FIG. 3 is a diagram illustrating the arrangement of an example of a simple pulse echo test set, and FIG. 4 is a diagram of a screen of the cathode ray tube of said pulse echo test set.

Referring first to FIG. 1 of the drawing, a conventional pulse echo test set 1 which transmits and receives pulses in a known manner is shown connected to a coil-loaded cable 8. A fault point 7 is arranged in the cable 8 adjacent a coil 6 which is one of a plurality of coils including a coil 5 between the test set 1 and the coil 6. Reference numeral 4 designates a coil section.

A $\cos^2$ pulse 2 is emitted by the test set 1 and travels in the direction of the headed arrow 11 associated therewith under conventional practices and methods. This $\cos^2$ pulse is reflected at the first coil 5 as a pulse 3 traveling in the direction of the headed arrow 12 toward the test set 1. This reflection of the pulse 2 occurs because the coils 5, 6 etc. are mismatched at the cable above their limiting frequencies and an approximate 100% reflection results at the connection between the cable 8 and the first coil 5. Thus, under conventional practices no pulse energy passes the first coil 5 and the fault at fault point 7 beyond the second coil 6 cannot be detected and/or tested.

In accordance with this invention damped sinusoidal oscillations 9 (FIG. 1) are applied to the cable 3 as a measuring pulse traveling in the direction of the headed arrow 13, the sinusoidal oscillations of the pulse having, for example, one half of the limiting frequency of the coil-loaded cable under test. The oscillations of pulse 9 pass the coils 5, 6 without reflection and are reflected at the fault point 7 as a pulse 10 in the direction of arrow 14. The fault point 7 can be, for example, a broken wire which reflects the pulse at the same phase as the pulse 9 but pulse 10 begins negatively because of the short-circuit drawn at point 7.

The reason for the passage of the damped sinusoidal oscillations of the pulse 9 beyond the coils 5, 6 of the cable 3 is readily apparent from FIG. 2 which illustrates the attenuation curve 15 of a coil-loaded cable, such as the cable 8, as a function of the frequency $f$ with the limiting frequency of the cable being indicated at $f1$. The curves 15 and 16 illustrate the amplitude envelopes of the frequency spectrum of corresponding damped sinusoidal oscillation pulses 17 and 18, respectively. Because the bandwidth of the pulses, as indicated by the curves 15, 16 is less than that of the cable, no disturbing attenuation in the frequency of the pulses occurs and they can easily pass the coils without reflection.

FIG. 3 shows a simplified embodiment of a pulse echo test set. In a pilot generator 20 pulses are produced at an interval of time between each other which is greater than double the pulse time delay of the cable length to be measured. These pulses start a pulse generator 21 which produces sinusoidal pulses passing via a coupling network 22 into a coil-loaded cable 23. A cable balancing network 24 permits, in conjunction with the said coupling network, to connect the coil-loaded cable in a reflection-free manner and to feed the echoes from the faults in the coil-loaded cable as well as part of the amplitude of the pulse transmitted by the generator 21, via an amplifier 25 to vertical deflecting plates 26 of a cathode ray tube 29.

Simultaneously with the pulse generator 21 also a calibrated time base 27 for horizontal deflecting plates 28 of the cathode ray tube is started by the pilot generator.

Now, when a suitable time base is chosen, the transmitted pulse which indicates the beginning of the echo ranging and the fault echo delayed by the time of transit to the fault and back are projected onto the screen of the cathode ray tube shown in FIG. 4. The distance between both pulses is read off on the graduated scale of the screen, as shown in dash lines in FIG. 4. The graduation on the screen may be made in units of time, units of length or coil sections.

I claim:
1. A method of echo ranging of faulty coil sections in coil-loaded cables, comprising the steps of
   (a) generating pulses in the form of damped sinusoidal oscillations having a relatively limited frequency spectrum, the frequency spectrum of said pulses being limited approximately to the range of bandwidth of the coil-loaded cable;
   (b) applying said pulses to said cable whereby the same pass the coils thereof and are reflected by faults in the cable or in the coils, and
   (c) determining the position of the faults from the reflected pulses.

2. The method as defined in claim 1, wherein the frequencies of the applied pulses is approximately one half of the limiting frequency of the coil-loaded cable under test and the number of said sinusoidal oscillations is at least one full cycle.

References Cited by the Examiner

FOREIGN PATENTS 220,196   12/1958   Australia.
754,200   8/1956    Great Britain.

WALTER L. CARLSON, *Primary Examiner.*

E. E. KUBASIEWICZ, *Assistant Examiner.*